F. J. GOSTLIN & L. MUELLER, Jr.
TIRE.
APPLICATION FILED FEB. 5, 1907.
918,846.
Patented Apr. 20, 1909.
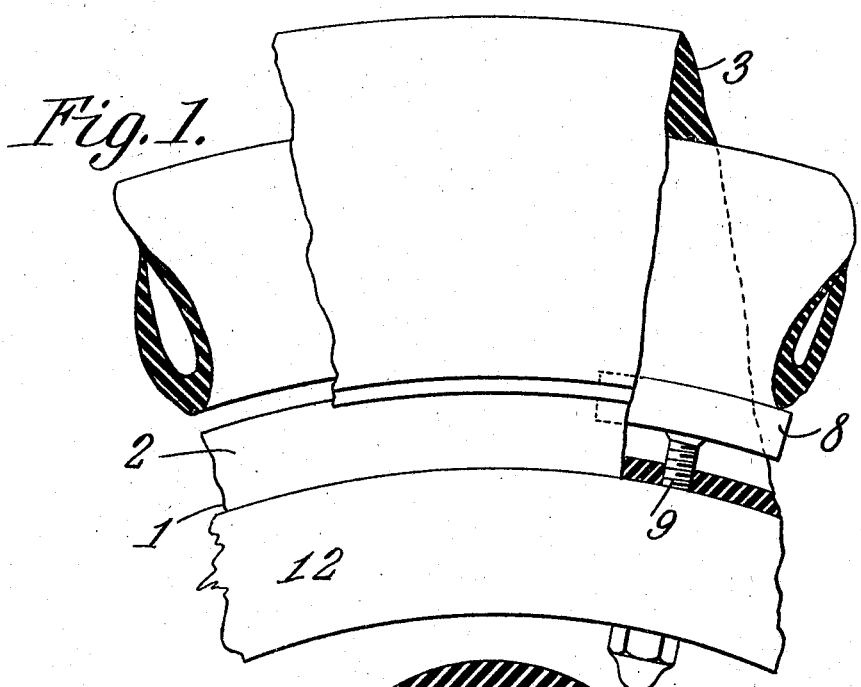
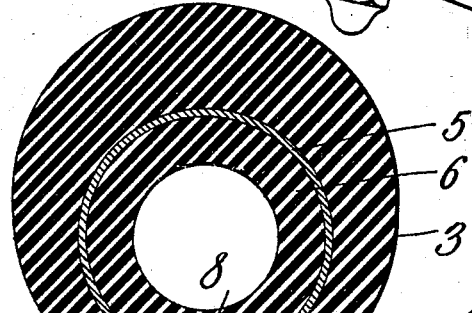
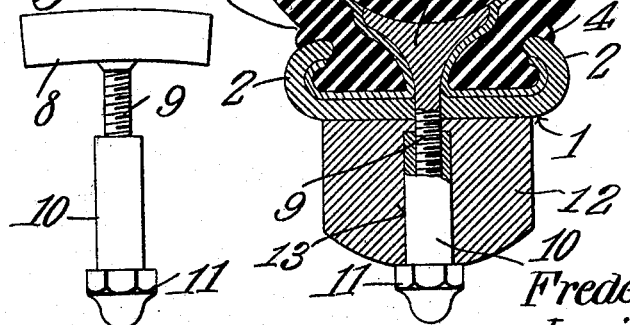
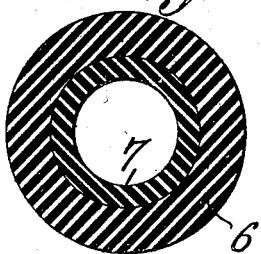
Frederick J. Gostlin,
Louis Mueller, Jr.
INVENTORS.
WITNESSES:
By C.A.Snow&Co.
ATTORNEYS

UNITED STATES PATENT OFFICE.

FREDERICK J. GOSTLIN AND LOUIS MUELLER, JR., OF AKRON, OHIO, ASSIGNORS OF ONE-THIRD TO CHARLES W. BONSTEDT, OF AULTMAN, OHIO.

TIRE.

No. 918,846.  Specification of Letters Patent.  Patented April 20, 1909.

Application filed February 5, 1907. Serial No. 355,911.

*To all whom it may concern:*

Be it known that we, FREDERICK J. GOSTLIN and LOUIS MUELLER, Jr., citizens of the United States, residing at Akron, in the county of Summit and State of Ohio, have invented a new and useful Tire, of which the following is a specification.

This invention has relation to tires, and it consists in the novel construction and arrangement of its parts as hereinafter shown and described.

The object of the invention is to provide an elastic tire which is so constructed as to stand up and maintain its proper configuration and resiliency without being inflated, and in which those parts that contact with the wheel rim will be protected from wear. As the tire is not subjected to greater pressure than atmospheric pressure there is no danger of the tire collapsing as a consequence of being punctured.

The tire consists primarily of an outer flexible sheath made of rubber or a mixture of rubber and fiber and lined with a flexible material such as canvas, which is continued around the rim-engaging portions of the sheath to provide shields to protect such portions from wear. A continuous hollow tube fits within the sheath and the edges of the sheath are held in contact with the wheel rim by suitable wedge shaped members located at intervals upon the rim of the wheel and provided with means for forcing and holding the edges of the sheath in contact with the flanges of the wheel rim. The sheath is provided with annular flanges which fit over the flanges of the wheel rim and prevent ingress of moisture between the sheath and the wheel rim.

In the accompanying drawing:—Figure 1 is a side elevation of a portion of the tire with parts broken away. Fig. 2 is a transverse sectional view of the tire. Fig. 3 is a side elevation of one of the wedges shown in Fig. 1. Fig. 4 is a transverse sectional view of a modified form of the inner continuous tube The wheel rim 1 is provided at its edges with the inwardly curved flanges 2, 2. The sheath 3 is made of rubber or a mixture of rubber and fiber and is adapted to fit at its edges within the flanges 2 of the rim 1. Said sheath is provided upon its exterior with the annular flanges 4 which fit snugly over the edges of the flanges 2 and prevent ingress of moisture between the sheath and the rim 1. The sheath 3 is lined with a material 5 such as canvas which is carried around the rim-engaging portions of the sheath and constitutes a shield to protect the sheath from wear. The continuous imperforated tube 6 fits within the sheath 3, and is of sufficient thickness to give the tire proper resiliency, and as the tube is not inflated with air at a greater pressure than atmospheric pressure it will not collapse should it be punctured, but will always stand up and hold the sheath 3 in proper position.

As shown in Fig. 4 of the drawing the tube 6 may be reinforced by an additional tube 7 located therein, the object of which is to increase the resiliency of the tube 6. The wedges 8 are located at intervals along the rim of the wheel and each wedge is provided with a screw threaded shank 9 which passes transversely through the wheel rim and into the felly 12. The felly 12 is provided with radial openings 13 each reduced at its upper terminal to form a shoulder within the opening 13. The sleeves 10 are journaled for rotation in the openings 13 in the felly and are internally threaded to receive the shanks 9, the upper terminals of the sleeves being arranged to abut against the shoulder of the opening 13. Each of the sleeves 10 has a head 11 arranged to contact with the surface of the felly 12 simultaneously with the engagement between the terminal of the sleeve and the shoulder in the opening 13, whereby the said sleeves 10 are given a firm bearing and the strain well distributed through the felly 12.

It is obvious that by turning the sleeves 10 the wedges 8 will be drawn toward the rim 1 and will force and retain the edges of the sheath 3 between the flanges 2 of the said rim 1. Also the said sleeves may be rotated in order to move the wedges 8 away from the rim 1 for the purpose of disconnecting the parts.

The tube 6 is circular in cross-section and fits snugly within the sheath 3. It is also in contact with the outer faces of the wedges, so that it will be securely held in place within the sheath. The outer faces of the wedges are concave transversely to conform to the circular cross section of the inner tube, and they are also curved lengthwise to conform to the contour of said tube, by reason of which a smooth surface is presented to the tube, and it is not bulged inwardly, whereby the entire resiliency of the tire is retained, and wear is effectually prevented.

Having described our invention what we claim as new and desire to secure by Letters Patent is:—

In a device of the class described, a felly and a rim mounted thereon, the felly having a radial opening reduced at its upper terminal to form an annular shoulder within the opening, and the rim having an opening alined with the reduced portion of the opening in the felly, the edges of the rim being inbent to form flanges; a sheath having a cylindrical bore and being anteriorly broadened to engage the flanges and being provided upon its exterior with annular ribs to overlie the flanges, the said sheath being longitudinally slitted upon its inner face; a cylindrical tube mounted in the bore of the sheath; a headed tubular sleeve internally threaded and being journaled for rotation in the opening in the felly, the head of the sleeve being arranged to engage the surface of the felly and the upper terminal of the sleeve being arranged to engage the shoulder in the felly simultaneously; a wedge disposed in the slit of the sheath and having a curved upper face to engage the tube, the said wedge having a threaded shank arranged to register in the opening in the rim and in the reduced portion of the opening in the felly and to engage the sleeve; and a flexible lining disposed between the sheath and the tube and between the wedge and the tube, the edges of the lining being prolonged to extend between the sheath and the rim and to inclose the broadened portion of the sheath.

In testimony that we claim the foregoing as our own, we have hereto affixed our signatures in the presence of two witnesses.

FREDERICK J. GOSTLIN.
LOUIS MUELLER, Jr.

Witnesses:
OSBORN ERGETT
W. E. SNYDER.